United States Patent [19]

Okumura et al.

[11] Patent Number: 4,957,964
[45] Date of Patent: Sep. 18, 1990

[54] THERMOPLASTIC RESIN COMPOSITION

[75] Inventors: Ryozo Okumura; Eiichi Terada, both of Sodegaura; Shigemi Kawazoe, Ichihara, all of Japan

[73] Assignee: Idemitsu Petrochemical Co., Ltd., Tokyo, Japan

[21] Appl. No.: 481,662

[22] Filed: Feb. 14, 1990

Related U.S. Application Data

[63] Continuation of Ser. No. 228,784, Aug. 4, 1988, abandoned, which is a continuation of Ser. No. 838,756, Mar. 12, 1986, abandoned.

[30] Foreign Application Priority Data

Mar. 29, 1985 [JP] Japan ................................. 60-63692

[51] Int. Cl.$^5$ ............................................. C08L 51/04
[52] U.S. Cl. ........................................ 525/64; 525/74; 524/269; 524/504
[58] Field of Search .................... 525/64, 74; 524/269, 524/504

[56] References Cited

U.S. PATENT DOCUMENTS

| | | | |
|---|---|---|---|
| 3,919,157 | 11/1975 | Ide et al. ................................ | 524/269 |
| 4,234,701 | 11/1980 | Abolins et al. ......................... | 525/74 |
| 4,513,108 | 4/1985 | Jones ..................................... | 525/74 |
| 4,634,732 | 1/1987 | Miller et al. .......................... | 525/64 |

FOREIGN PATENT DOCUMENTS

| | | | |
|---|---|---|---|
| 2827594 | 10/1979 | Fed. Rep. of Germany ........ | 525/64 |
| 0107950 | 8/1979 | Japan .................................... | 525/64 |

Primary Examiner—Lewis T. Jacobs
Assistant Examiner—Vasu S. Jagannathan
Attorney, Agent, or Firm—Frishauf, Holtz, Goodman & Woodard

[57] ABSTRACT

The thermoplastic resin composition of the invention comprises (A) from 50 to 90 parts by weight of a copolymer of an aromatic vinyl monomer and an unsaturated dicarboxylic acid anhydride, e.g. copolymer of styrene and maleic anhydride, (B) from 50 to 10 parts by weight of an ABS or MBS resin and (C) from 0.01 to 1.0 part by weight of an organopolysiloxane. In contrast to conventional polymer blend compositions composed of the above mentioned components (A) and (B), the inventive resin composition is capable of giving a shaped article having a greatly improved impact strength without adverse influences on the heat resistance and surface luster of the shaped articles molded of a resin composition of this type inherent thereto.

6 Claims, No Drawings

THERMOPLASTIC RESIN COMPOSITION

This application is a continuation of application Ser. No. 228,784, filed Aug. 4, 1988, now abandoned, which is a continuation of application Ser. No. 838,756 filed Mar. 12, 1986, now abandoned.

BACKGROUND OF THE INVENTION

The present invention relates to a thermoplastic resin composition position or, more particularly, to a thermoplastic resin composition capable of giving various kinds of shaped articles by molding having excellent impact strength as well as heat resistance and surface luster and useful in the fields of electric appliances, automobiles, foodstuff industries, medical technology, miscellaneous daily necessaries and the like.

Among various kinds of thermoplastic resins currently used in the above mentioned applications, copolymers of an aromatic vinyl monomer and an unsaturated dicarboxylic acid anhydride or, in particular, copolymers of styrene and maleic anhydride, referred to as SMA hereinbelow, are superior to other styrene-based synthetic resins in respect of the heat resistance though with some disadvantageously poor mechanical properties including, in particular, the impact strength.

With an object to improve the impact strength of the SMA type copolymers, a method has been proposed in which the copolymerization of styrene and maleic anhydride is performed in the presence of a rubbery polymer. Though effective in respect of the improved impact strength of the resultant resin product, this method, however, is not free from several disadvantages including the difficulties encountered in the control of the polymerization reaction due to the increase in the viscosity of the polymerization mixture and the poor heat resistance and surface luster of the shaped articles molded of the resin product.

As another approach to the solution of this problem, an attempt has been made to formulate a polymer blend of which simultaneous improvements can be obtained in both respects of the impact strength and heat resistance which otherwise are contradictory to each other (see, for example, Japanese Pat. Kokai No. 50553/1979). A promising polymer blend disclosed so far therein is prepared by blending a SMA with a kind of copolymeric resin of acrylonitrile, butadiene and styrene (referred to as ABS hereinbelow) and a kind of polycarbonate resin. A problem in this type of polymer blend is the insufficient improvement in the impact strength with thermal degradation of the rubbery constituent because the polycarbonate resin can be dispersed uniformly in the blend only by milling at a relatively high temperature.

SUMMARY OF THE INVENTION

An object of the present invention is therefore to provide a novel thermoplastic resin composition based on SMA which is imparted with greatly improved impact strength without decreasing the excellent heat resistance and surface luster of the shaped articles inherent to the SMA resins.

More particularly, the object of the invention is to provide a novel thermoplastic polymer blend composition comprising a SMA resin and an ABS resin or MBS resin, i.e. a copolymeric resin of methyl methacrylate, butadiene and styrene; without problems and disadvantages in similar polymer blend compositions of prior art in respect of the contradictory requirements for the impact strength and heat resistance or surface luster of shaped articles thereof.

Thus, the inventive thermoplastic resin composition or polymer blend composition established as a result of the extensive investigations comprises:
(A) from 50 to 90 parts by weight of a copolymer of an aromatic vinyl monomer and an unsaturated dicarboxylic acid anhydride;
(B) from 50 to 10 parts by weight of a thermoplastic resin which is obtained by the copolymerization of at least two kinds of monomers selected from the group consisting of esters of methacrylic acid, vinyl cyanide monomers and aromatic vinyl monomers in the presence of a rubbery polymer; and
(C) from 0.01 to 1.0 part by weight of an organopolysiloxane.

DETAILED DESCRIPTION OF THE PREFERRED EMBODIMENTS

As is understood from the above given summarizing description, the principal ingredient in the thermoplastic polymer blend composition is the component (A) which is a copolymer of an aromatic vinyl monomer and an unsaturated dicarboxylic acid anhydride.

The aromatic vinyl monomer here implied includes, in addition to styrene as the most typical one, various kinds of styrenic monomers such as $\alpha$-methyl styrene, 2-methyl styrene, 3-methyl styrene, 4-methyl styrene, 2,4-dichloro styrene, 2,5-dichloro styrene, dimethyl styrenes and the like. In the copolymerization of these aromatic vinyl monomers and an unsaturated dicarboxylic acid anhydride, it is optional that the aromatic vinyl monomer is partly replaced with other kinds of copolymerizable monomers such as methacrylic acid, methyl methacrylate, methyl acrylate, ethyl methacrylate, acrylonitrile, methacrylonitrile, halogen-containing vinyl monomers and the like.

The unsaturated dicarboxylic acid anhydride copolymerized with the above described aromatic vinyl monomer is typically and preferably maleic anhydride but other usable anhydrides include those of itaconic acid, citraconic acid, mesaconic acid, ethyl maleic acid, methyl itaconic acid, chloromaleic acid and the like.

The copolymer as the component (A) in the inventive thermoplastic polymer blend composition can be prepared by the copolymerization of the above described aromatic vinyl monomer and unsaturated dicarboxylic acid anhydride in a known procedure of polymerization such as solution polymerization, bulk polymerization, bulk-suspension polymerization and the like. If desired, the copolymerization may be performed by admixing the polymerization mixture with a rubbery polymer so that a rubber-modified copolymer is obtained. Various kinds of rubbers can be used for such a purpose including natural and synthetic rubbers such as polybutadiene rubbers, butyl rubbers, copolymeric rubbers of styrene and butadiene, acrylonitrile rubbers, copolymeric rubbers of ethylene and propylene and so on.

A preferable class of the copolymer as the component (A) includes the SMA resins, i.e. copolymers of styrene and maleic anhydride. The SMA resin should contain, preferably, from 1 to 30% by weight or, more preferably, from 3 to 25% by weight of maleic anhydride. When the content of maleic anhydride in the SMA resin is smaller than 1% by weight, the resultant polymer blend admixed therewith may have poor heat resistance while a polymer blend admixed with a SMA resin, in which the content of maleic anhydride is larger than 30% by weight, may be poor in the impact strength.

The component (A) is used in an amount from 50 to 90 parts by weight or, preferably, from 60 to 85 parts by weight based on the total amount (100 parts by weight) of the component (A) and the component (B).

The component (B) is a thermoplastic resin which is a copolymer obtained by the copolymerization of at least two kinds of the monomers selected from the group consisting of esters of methacrylic acid, vinyl cyanide monomers and aromatic vinyl monomers in the presence of a rubbery polymer Various kinds of rubbers can be used in the above mentioned purpose including dienic rubbers and mixtures thereof such as butadiene rubbers (BR), isoprene rubbers (IR), chloroprene rubbers (CR), piperyrene rubbers, copolymeric rubbers of styrene and butadiene, block-copolymeric rubbers of styrene and butadiene and copolymeric rubbers of acrylonitrile and butadiene (NBR) as well as copolymeric rubbers of ethylene and propylene (EPR), ternary copolymeric rubbers of ethylene, propylene and a minor amount of a dienic monomer (EPT), copolymeric rubbers of isobutylene and isoprene (IIR), copolymeric rubbers of ethylene and vinyl acetate, chlorinated polyethylenes, epichlorohydrin rubbers, copolymeric rubbers of ethylene and acrylic acid or a derivative thereof, rubbers of acrylic acid or a derivative thereof and so on. Butadiene rubbers (BR) are particularly preferable among the above named rubbers.

The esters of methacrylic acid, i.e. the methacrylate ester monomer as one of the comonomers for the component (B) is exemplified by methyl methacrylate, ethyl methacrylate, propyl methacrylate, isopropyl methacrylate, butyl methacrylate and the like, of which methyl methacrylate is preferred.

The vinyl cyanide monomer as the second class of the comonomers for the component (B) may be acrylonitrile or methacrylonitrile.

The aromatic vinyl monomer as the third class of the comonomers for the component (B) is exemplified by the same compounds as given as the examples of the aromatic vinyl monomers for the preparation of the component (A) including, for example, styrene, α-methyl styrene, 2-methyl styrene, 3-methyl styrene, 4-methyl styrene, dimethyl styrenesm chlorostyrenes and the like.

The component (B) used in the inventive polymer blend composition is a copolymeric thermoplastic resin obtained by the copolymerization of at least two kinds of the monomeric compounds selected from the group consisting of the above described methacrylate ester monomers, vinyl cyanide monomers and aromatic vinyl monomers by a known procedure of polymerization such as solution polymerization, bulk polymerization, suspension polymerization, bulk-suspension polymerization, emulsion polymerization and so on in the presence of the above mentioned rubbery polymer.

When a thermoplastic resin containing a relatively large amount of the rubbery ingredient is desired, the procedure of emulsion graft polymerization is suitable for the preparation thereof. For example, a methacrylate ester monomer and an aromatic vinyl monomer are graft-polymerized by emulsion polymerization on to a polybutadiene-based latex and the thus obtained polybutadiene-based copolymeric latex is subjected to coagulation of the polymer using an inorganic acid or an inorganic salt such as aluminum sulfate to give the desired copolymeric thermoplastic resin.

A particularly preferable example of the component (B) is a thermoplastic resin obtained by the copolymerization of styrene and methyl methacrylate or styrene and acrylonitrile in the presence of a polybutadiene or a butadiene-based copolymer containing at least 30% by weight of butadiene. In the above mentioned combinations of the comonomers, it is optional to partly replace the styrene with a-methyl styrene. Preferable examples of the component (B) include so-called MBS resins, i.e. copolymeric resins of methyl methacrylate, butadiene and styrene, and ABS resins, i.e. copolymeric resins of acrylonitrile, butadiene and styrene. Particularly preferable MBS and ABS resins should be composed of from 30 to 90% by weight of the butadiene rubber, from 40 to 2% by weight of the units of methyl methacrylate or acrylonitrile and from 40 to 2% by weight of the units of styrene.

The component (B) described above is used in an amount in the range from 50 to 10 parts by weight or, preferably, from 40 to 15 parts by weight based on the total amount (100 parts by weight) of the component (A) and the component (B). When the amount of the component (B) is in excess of the above mentioned upper limit, the heat resistance of the resultant polymer blend is somewhat decreased while, on the other hand, no sufficient improvement can be obtained in the impact strength of the shaped article molded with the inventive polymer blend composition when the amount of the component (B) is smaller than the above mentioned lower limit.

The component (C) as the most characteristic constituent of the inventive polymer blend composition is an organopolysiloxane which is a polymer formed by the recurring units represented by the general formula

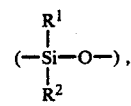

in which $R^1$ and $R^2$ are each a monovalent hydrocarbon group such as an alkyl, aryl, aralkyl or alkenyl group independently from the other. The organopolysiloxane as the component (C) in the inventive polymer blend may be either a homopolymeric organopolysiloxane composed of the recurring units of one and the same kind or a random-, block- or graft-copolymeric organopolysiloxane composed of two or more kinds of the recurring units expressed by the above given general formula. It is further optional that the monovalent hydrocarbon groups denoted by $R^1$ and $R^2$ in the general formula are partly replaced with hydroxy groups, alkoxy groups, hydroxyalkoxy groups and polyhydroxy alkylene groups according to need. The component (C) can be a single kind of the organopoly-siloxane or a mixture of two or more kinds of the organopolysiloxanes.

Exemplary of particularly suitable organopolysiloxanes as the component (C) are dimethylpolysiloxanes, methylphenylpolysiloxanes, diphenylpolysiloxanes and the like, of which dimethylpolysiloxanes are preferred. Though not particularly limitative, the organopolysiloxane should preferably have a viscosity in the range from 10 to 100,000 centistokes or, more preferably, from 50 to 2000 centistokes at 30° C. An organopolysiloxane having a too low viscosity may result in a poor appearance of the shaped article molded of the polymer blend composition containing the same because such an organopolysiloxane contains a relatively large amount of volatile matters. An organopolysiloxane having a viscosity in excess of 100,000 centistokes at 30° C. is undesirable because of the low dispersibility thereof to give a uniform polymer blend.

The organopolysiloxane as the component (C) is used in the inventive polymer blend composition in an amount in the range from 0.01 to 1.0 part by weight or, preferably, from 0.05 to 0.5 part by weight based on the total amount (100 parts by weight) of the component (A) and the component (B). When the amount of the component (C) is too small, no sufficient improvement can be obtained in the impact strength of the shaped article molded of the polymer blend composition. On the other hand, no further improvement can be expected in the impact strength even by increasing the amount of the component (C) rather with an adverse influence on the heat resistance.

In addition to the above described essential components (A), (B) and (C), the thermoplastic resin composition of the present invention may optionally be admixed according to need with various kinds of known additives conventionally used in thermoplastic resin compositions including, for example, indophenol-based and phosphorus-containing antioxidants, ultraviolet absorbers, flame retardants, plasticizers, lubricants, inorganic fillers such as glass fibers, silicates, titanium dioxide and the like, and thermoplastic resins such as polystyrene, polyethylene, polypropylene and the like.

The thermoplastic resin composition of the present invention can be prepared by merely blending the above described components (A), (B) and (C) and optional ingredients in a suitable blending machine. Alternatively, the component (C) can be added to the polymerization mixture for the preparation of the component (A) or (B) in advance so that the component (A) or (B) as polymerized already contains the component (C) prior to blending with the other components.

As is understood from the above description, the greatly improved impact strength of the shaped articles is the most characteristic advantage of the inventive thermoplastic resin composition prepared in the above described manner although the inventive resin composition is advantageous also in respect of the excellent heat resistance and surface luster of the shaped articles molded thereof. Therefore, the inventive thermoplastic resin composition is useful as a molding material in a procedure of extrusion molding, injection molding and the like for shaping various kinds of articles widely as or used in the fields of electric appliances, automobiles, foodstuff industry, medical technology, miscellaneous daily necessaries and so on.

Following are the examples and comparative examples to illustrate the thermoplastic resin composition of the invention in more detail. In the following, the expression of "parts" always refers to "parts by weight".

EXAMPLES 1 to 12 and COMPARATIVE EXAMPLES 1 to 6

In each of the Examples and Comparative Examples, a thermoplastic resin composition was prepared by uniformly blending, in a single-screw extruder machine at 180° C., three components including a copolymer of styrene and maleic anhydride, referred to as SMA-1 or SMA-2, as the component (A), an ABS resin, referred to as ABS, or an MBS resin, referred to as MBS, as the component (B) and a dimethylpolysiloxane fluid, referred to as Silicone-1 or Silicone-2, as the component (C) in a weight proportion shown in Table 1 below. These component polymers are characterized in the following.

SMA-1: a copolymer of styrene and maleic anhydride of which the content of maleic anhydride was 14% by moles having a weight average molecular weight of about 200,000 by the method of gel permeation chromatography with reference to polystyrenes.

SMA-2: a copolymer of styrene and maleic anhydride of which the content of maleic anhydride was 7% by moles having a weight average molecular weight of about 260,000 by the method of gel permeation chromatography with reference to polystyrenes ABS: prepared by the emulsion graft-copolymerization of 0 parts of acrylonitrile and 10 parts of styrene on 60 parts of polybutadiene MBS: prepared by the emulsion graft-copolymerization of 25 parts of methyl methacrylate and 15 parts of styrene on 60 parts of polybutadiene Silicone-1: a dimethyl silicone fluid having a viscosity of 200 centistokes at 30° C. (SH 200.200 cs, a product by Toray Silicone Co.)

Silicone-2: a dimethyl silicone fluid having a viscosity of 1000 centistokes at 30° C. (SH 200.1000 cs, a product by Toray Silicone Co.)

The thus prepared thermoplastic resin compositions were each subjected to the evaluation tests of the Izod impact strength according to the procedure specified in JIS K 6872 with notched specimens, the thermal distortion temperature according to the procedure specified in JIS K 6872 without annealing and the surface luster according to the procedure specified in JIS Z 8741 to give the results shown in Table 1.

TABLE 1

|  |  | Component | | | Results of evaluation | | |
|---|---|---|---|---|---|---|---|
|  |  | (A), SMA-1 or -2 (parts) | (B), ABS or MBS (parts) | (C), silicone-1 or -2 (parts) | Izod impact strength kg · cm/cm$^2$ | Thermal distortion temperature °C. | Luster |
| Example | 1 | 1 (70) | ABS (30) | 1 (0.1) | 12.9 | 103.5 | 70 |
|  | 2 | 1 (80) | ABS (20) | 1 (0.1) | 7.0 | 106.1 | 75 |
|  | 3 | 1 (60) | MBS (40) | 1 (0.1) | 19.3 | 102.7 | 88 |
|  | 4 | 1 (70) | MBS (30) | 1 (0.1) | 14.9 | 105.5 | 89 |
|  | 5 | 1 (80) | MBS (20) | 1 (0.1) | 9.5 | 107.0 | 92 |
|  | 6 | 1 (80) | MBS (20) | 1 (0.3) | 10.0 | 106.5 | 92 |
|  | 7 | 1 (80) | MBS (20) | 2 (0.2) | 9.6 | 107.0 | 91 |
|  | 8 | 1 (85) | MBS (15) | 1 (0.1) | 7.5 | 107.6 | 92 |
|  | 9. | 2 (70) | ABS (30) | 1 (0.1) | 8.2 | 97.0 | 67 |
|  | 10 | 2 (80) | ABS (20) | 1 (0.1) | 6.0 | 99.0 | 73 |
|  | 11 | 2 (70) | MBS (30) | 1 (0.1) | 12.5 | 97.4 | 90 |
|  | 12 | 2 (80) | MBS (20) | 1 (0.1) | 8.8 | 99.2 | 91 |

TABLE 1-continued

| | | Component | | | Results of evaluation | | |
| --- | --- | --- | --- | --- | --- | --- | --- |
| | | (A), SMA-1 or -2 (parts) | (B), ABS or MBS (parts) | (C), silicone-1 or -2 (parts) | Izod impact strength kg · cm/cm$^2$ | Thermal distortion temperature °C. | Luster |
| Comparative Example | 1 | 1 (95) | ABS (5) | 1 (0.1) | 2.5 | 108.0 | 78 |
| | 2 | 1 (45) | ABS (55) | 1 (0.1) | 23.2 | 95.2 | 64 |
| | 3 | 1 (80) | ABS (20) | none | 2.5 | 106.5 | 75 |
| | 4 | 2 (95) | MBS (5) | 1 (0.1) | 2.8 | 99.7 | 93 |
| | 5 | 2 (45) | MBS (55) | 1 (0.1) | 25.0 | 87.8 | 86 |
| | 6 | 2 (80) | MBS (20) | none | 3.0 | 99.2 | 92 |

What is claimed is:

1. A thermoplastic resin composition which comprises:
   (A) from 50 to 90 parts by weight of a copolymer of styrene and maleic anhydride which contains from 1 to 30% by weight maleic anhydride;
   (B) from 50 to 10 parts by weight of a thermoplastic resin which is a copolymer of 60% to 90% by weight of butadiene rubber, 40% to 2% by weight styrene and 40% to 2% by weight of methyl methacrylate; and
   (C) from 0.01 to 1.0 parts by weight of an organopolysiloxane having a viscosity of from 10 to 100,000 centistokes at 30° C. which is selected from the group consisting of dimethyl polysiloxanes, methyl phenyl polysiloxanes and diphenyl polysiloxanes.

2. The thermoplastic resin composition of claim 1 wherein the organopolysiloxane as the component (C) is selected from the group consisting of methyl phenyl polysiloxanes and diphenyl polysiloxanes.

3. The thermoplastic resin composition of claim 1 wherein the content of maleic anhydride in the copolymer of styrene and maleic anhydride is from 3 to 25% by weight.

4. The thermoplastic resin composition of claim 1 wherein the component (A) is in an amount of from 60 to 85 parts, the component (B) is in an amount of from 40 to 15 parts, and the component (C) is in an amount of from 0.05 to 0.5 part.

5. The thermoplastic resin composition of claim 4 wherein the component (C) has a viscosity of from 50 to 2,000 centistokes at 30° C.

6. The thermoplastic resin composition of claim 5 wherein said component (C) is a dimethyl polysiloxane.

* * * * *